US012508562B2

(12) United States Patent
Khusidman et al.

(10) Patent No.: US 12,508,562 B2
(45) Date of Patent: Dec. 30, 2025

(54) SYSTEM AND METHOD FOR CONVERTING POLYMER CONTAINING MATERIALS INTO HIGH SURFACE SOLID, LIQUID AND GASEOUS PRODUCTS

(71) Applicant: G3C Technologies Corporation, Basking Ridge, NJ (US)

(72) Inventors: Vitaly B Khusidman, Warren, NJ (US); Alexander Khusidman, Jenkintown, PA (US)

( * ) Notice: Subject to any disclaimer, the term of this patent is extended or adjusted under 35 U.S.C. 154(b) by 899 days.

(21) Appl. No.: 17/745,379

(22) Filed: May 16, 2022

(65) Prior Publication Data

US 2023/0364571 A1 Nov. 16, 2023

(51) Int. Cl.
| | |
|---|---|
| *B01J 6/00* | (2006.01) |
| *B29B 17/02* | (2006.01) |
| *C09C 1/48* | (2006.01) |
| *C10L 1/00* | (2006.01) |
| *C10L 3/00* | (2006.01) |

(52) U.S. Cl.
CPC ............... *B01J 6/008* (2013.01); *B29B 17/02* (2013.01); *C09C 1/482* (2013.01); *C10L 1/00* (2013.01); *C10L 3/00* (2013.01)

(58) Field of Classification Search
CPC .......... B01J 6/008; B29B 17/02; C09C 1/482; C10L 1/00; C10L 3/00; Y02P 20/143; C10G 1/10
See application file for complete search history.

(56) References Cited

U.S. PATENT DOCUMENTS

| | | | |
|---|---|---|---|
| 4,588,477 A | 5/1986 | Habib | |
| 5,230,777 A | 7/1993 | Jarrell | |
| 5,961,946 A | 10/1999 | Takegawa | |
| 9,663,662 B1 * | 5/2017 | Khusidman | ............. C10B 47/44 |
| 2013/0327630 A1 | 12/2013 | Schulz | |

FOREIGN PATENT DOCUMENTS

WO 2006119594 A1 11/2006

OTHER PUBLICATIONS

PCT International Search and Opinion dated Jul. 21, 2023.

* cited by examiner

*Primary Examiner* — Daniel C. McCracken
(74) *Attorney, Agent, or Firm* — Law Office of Ilya Libenzon

(57) ABSTRACT

A reactor for converting polymer containing materials, such as rubber, including tire rubber, or pyrolyzed rubber, including pyrolyzed tires, or plastic, including pyrolyzed plastic, into output products includes a feed section, a central heating-zone section having a first processing zone configured to heat the material to a first temperature and a second processing zone configured to maintain the material at the first temperature, a discharge section, means for withdrawal of vaporized short-chain hydrocarbon compounds being formed, at least one water steam injector configured to introduce water steam into the interior of the second processing zone and positioned at the bottom of the second processing zone, or at least one CO2 gas injector configured to introduce CO2 gas into the interior of the second processing zone and positioned at the bottom of the second processing zone, or both, and heating means for heating the material. The reactor can include at least one more reactor thereby forming a modular system having a battery of side-by-side positioned reactors.

14 Claims, 10 Drawing Sheets

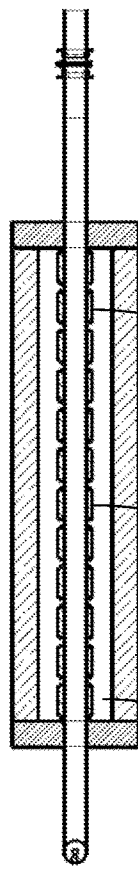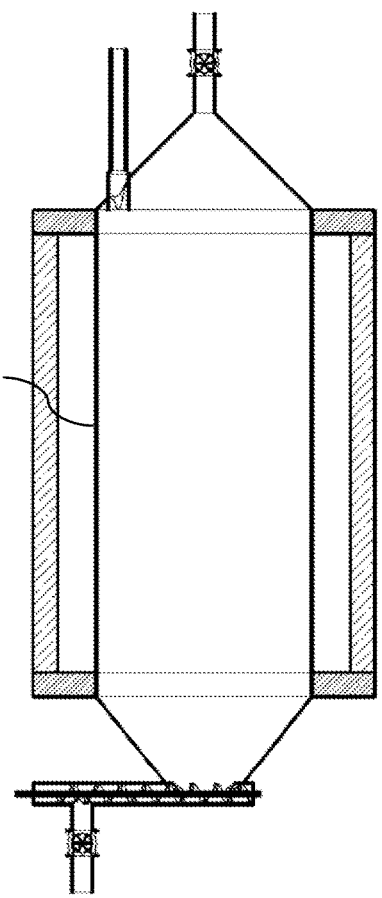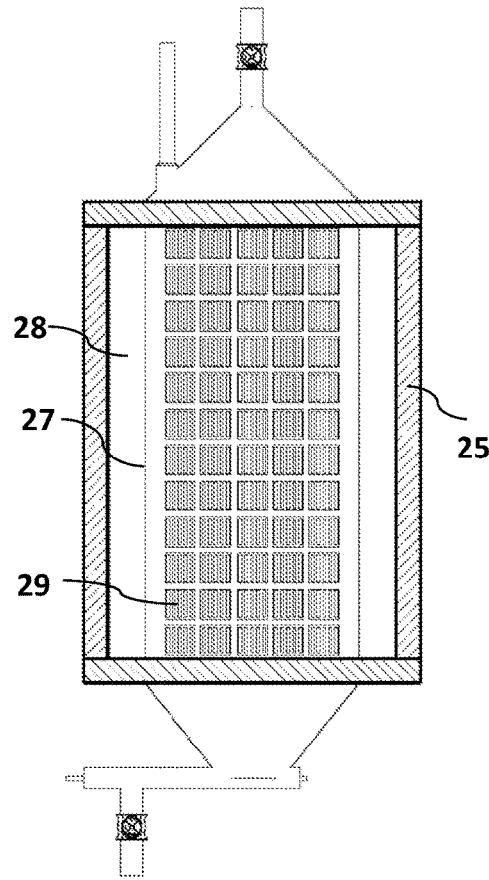
SECTION B-B    SECTION C-C    SECTION A-A
FIG. 4A    FIG. 4B    FIG. 4C

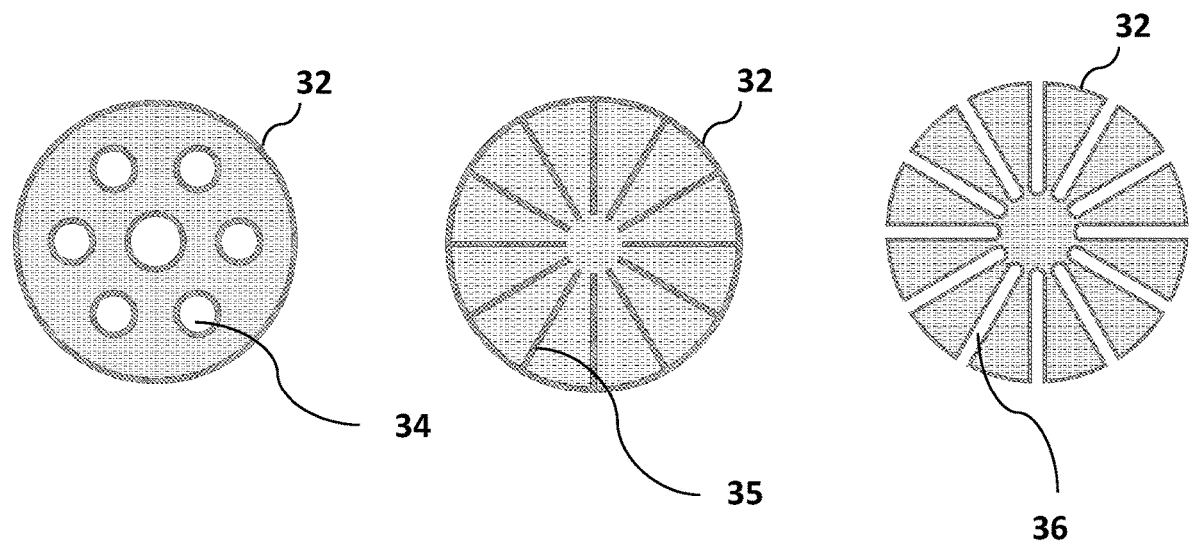
FIG. 9A  FIG. 9B  FIG. 9C
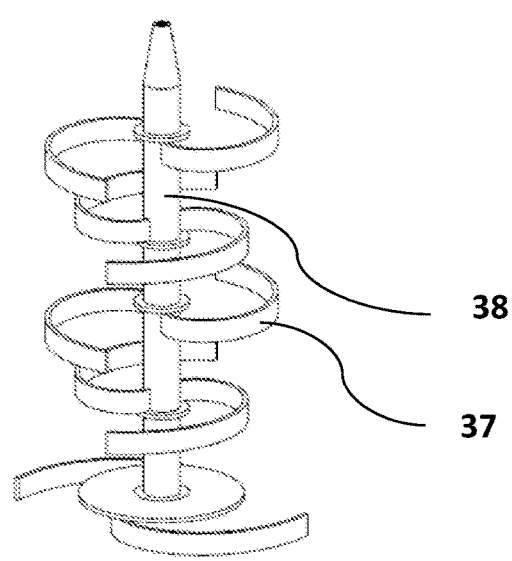
FIG. 9D

300

---

Heating the material to a first temperature in the first processing zone of the reactor
301

↓

Maintaining the material at the first temperature in the second processing zone of the reactor
302

↓

Introducing water steam by the water steam injector to the second processing zone of the reactor while maintaining the material at the first temperature
303a

↓ or alternatively, introducing $CO_2$ gas by the $CO_2$ gas injector to the second processing zone of the reactor while maintaining the material at the first temperature
303b

FIG. 10

SYSTEM AND METHOD FOR CONVERTING POLYMER CONTAINING MATERIALS INTO HIGH SURFACE SOLID, LIQUID AND GASEOUS PRODUCTS

TECHNICAL FIELD

The device and methods disclosed herein relate generally to devices and methods for recycling polymer-containing materials using conversion processes and systems, and specifically to a conversion of tire-derived materials into high surface area and high structure carbon black, liquid, and gaseous products.

BACKGROUND ART

Approximately 2.9 billion tires are forecasted to be produced by 2027 worldwide, with 590 million tires to be sold annually in the United States alone. Each of those tires will eventually end as end-of-life tires (ELTs). It is estimated that one car tire per person is discarded each year in the developed countries, and that around 4 billion of tires have been accumulated in stockpiles around the world. Significant additional quantities of ELTs are disposed of by other, less organized means. Tire piles often provide breeding grounds for pests and insects such as mosquitoes, because their shape and impermeability allow them to hold water for extended periods. Waste tire stockpiles are difficult to ignite; however, once ignited, tires burn very hot and are very difficult to extinguish, often burning for years and resulting in considerable release of air pollutants, including particulates. Tires are not biodegradable, and thus can remain to present the above hazards for many years after disposal. Used tires thus represent an environmental hazard and their elimination is an important task for human civilization.

Policies concerning the management of ELTs and in general of any waste follow a hierarchical approach, attempting to alleviate the environmental impact according to the following order: waste minimization, reuse, recycling, energy recovery, and landfilling. Legislation related to waste management is driving the search for economic and environmental mechanisms that can contribute to solve the waste disposal problem. Scrap tire disposal in landfills is banned in the European Union and highly discouraged in the United States. Therefore, material recycling and/or energy recovery would appear to have a high potential for the future. Efforts to eliminate tire derived material by recycling and other methods have been ongoing for some time, with jurisdictions such as the European Union and the United States making a concerted effort to encourage more environmentally friendly disposal methods. New methods such as pyrolysis to extract materials from tire scraps have been developed and shown considerable promise for recovering energy and economically useful products such as metal, gas, oil, and carbon black from the tire scraps. Nonetheless, the methods used thus far have failed to recover materials efficiently enough to make pyrolysis of tires a viable pursuit. As a result, over 14% of ELTs in the United States are still cast into landfills.

Global manufacturers of tire and other rubber and plastic products are under the pressure by regulatory, market and social forces to increase the share of used recycled feedstock materials. Tire derived recovered carbon black (rCB) is well positioned to augment and/or replace traditional carbon black, also known as virgin carbon black (vCB). Most major tire manufacturer have committed to augment a large share of vCB with rCB by 2030 and to replace a major share of vCB by rCB by 2050. The most advanced existing pyrolysis technologies are only capable to produce rCB suited to augment vCB in tire carcass, but not in tire tread. The present invention provides a technology for production tire derived rCB suited for full replacement of vCB in tire carcass and augmenting and, potentially, for replacement of vCB in tire tread.

Therefore, there remains a need for an efficient system and process for recycling and/or extracting material from ELTs, capable to be used for high demand rubber and plastic applications.

SUMMARY OF THE EMBODIMENTS

A reactor for converting polymer containing materials, such as rubber or pyrolyzed rubber (collectively rubber derived materials), including tire rubber or pyrolyzed tire rubber (collectively tire derived materials), or plastic, including pyrolyzed plastic (collectively plastic derived materials), into output products includes a feed section, a central heating-zone section having a first processing zone configured to heat the material to a first temperature and a second processing zone configured to maintain the material at the first temperature, a discharge section, means for withdrawal of vaporized short-chain hydrocarbon compounds being formed, at least one water steam injector configured to introduce water steam into the interior of the second processing zone and positioned at the bottom of the second processing zone, or at least one $CO_2$ gas injector configured to introduce $CO_2$ gas into the interior of the second processing zone and positioned at the bottom of the second processing zone, or both, and heating means for heating the material.

In a related embodiment, the means for withdrawal of vaporized short-chain hydrocarbon compounds being formed is at least one opening disposed in the feed section and connected to a withdrawal conduit. In some instances, the first temperature is maintained between 700 degrees C. and 950 degrees C. According to some embodiments of the present invention, the reactor also includes a feed airlock coupled to the top of the reactor and configured to maintain substantially oxygen free atmosphere in the reactor and a discharge airlock coupled to the bottom of the reactor and configured to maintain substantially oxygen free atmosphere in the reactor.

Other aspects, embodiments and features of the disclosed device and method will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method is shown, where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood that the invention is not limited to the precise arrangements and instrumentalities shown.

FIG. 4A is a cross-sectional view of the reactor shown in FIG. 3 taken along the B-B lines.

FIG. 4B is a cross-sectional view of the reactor shown in FIG. 3 taken along the C-C lines.

FIG. 4C is a cross-sectional view of the reactor shown in FIG. 3 taken along the A-A lines.

FIGS. 9A, 9B, 9C, and 9D illustrate various heat distribution means that can be incorporated into the reactor of the present disclosure.

FIG. 10 is a flow diagram illustrating one embodiment of the disclosed method for conversion of tire-derived material.

DETAILED DESCRIPTION OF SPECIFIC EMBODIMENTS

Figure 1:
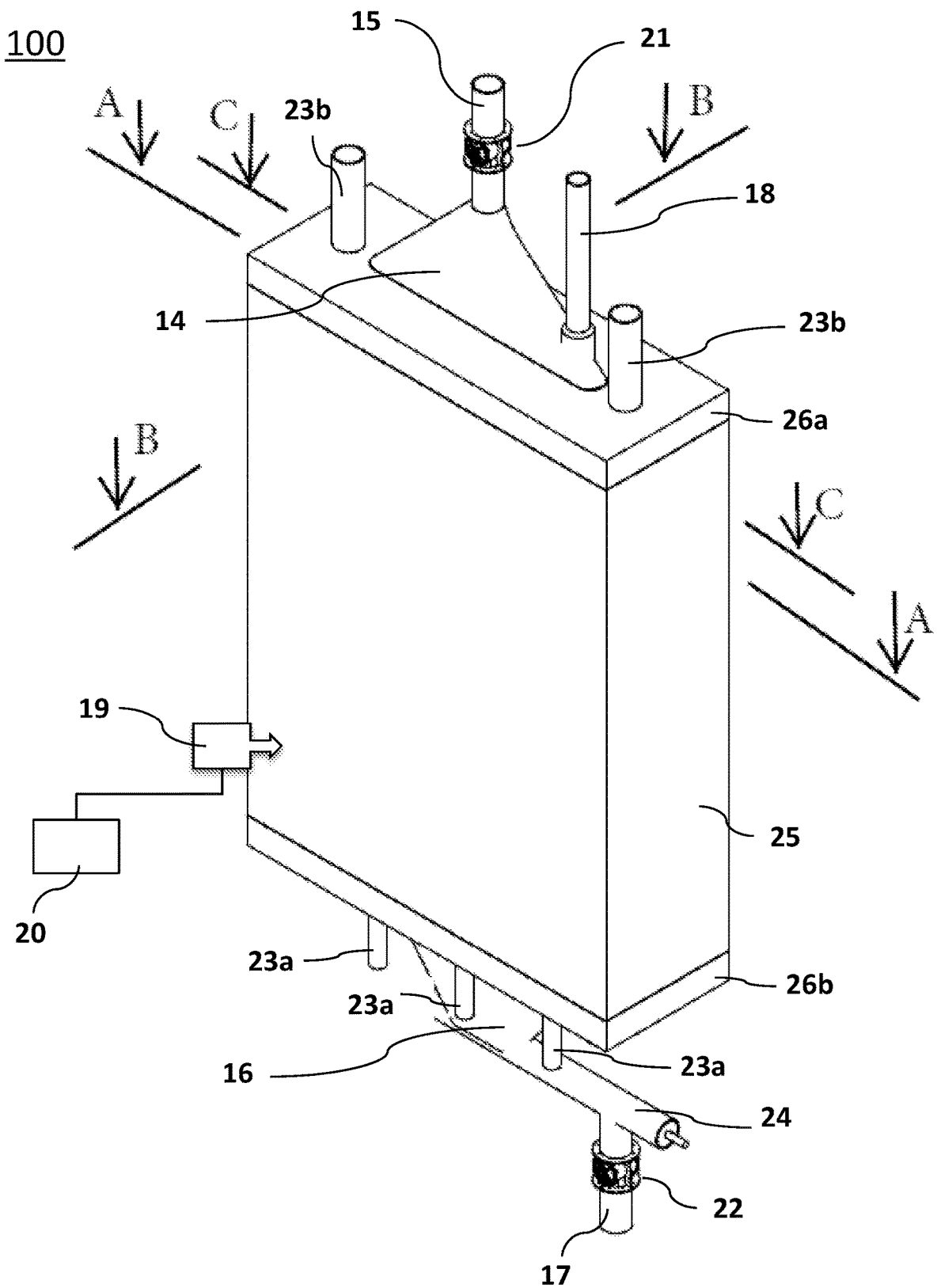
FIG. 1 is a perspective view illustrating one embodiment of the disclosed reactor having a gas heating configuration.

Embodiments of the disclosed apparatus and method relate to the production of high surface area and high structure recovered carbon black, oil and gas through the thermal treatment of ELTs or other rubber materials in substantially oxygen free atmosphere; embodiments of the disclosed reactor and method enable finer control over the quality and ranges of materials produced during conversion. Contained in ELTs metal is removed before and/or after the thermal treatment. Some embodiments achieve this through conversion that includes conversion of organic material at elevated temperatures in presence of water steam or CO2 gas or both; this may create new molecules combining products from the tire-derived material with elements sourced from the water or/and CO2. The use of a sequence of temperature stages with the strategic introduction of water steam or/and CO2 gas enhances all existing processes for conversion of tire-derived materials into carbon black. Water or/and CO2 are participating as reagents of the chemical reaction, contributing to creating micro-, meso- and macropores in the primary carbon black particle, and, thus, increasing carbon black surface area and structure. This allows to achieve enhanced quality characteristics of the produced material, including but not limited to reinforcement quality in rubber compounds, suitable for different industrial applications, including but not limited to manufacturing of new tires.

FIG. 1, 2A-2C illustrate a reactor 100 for converting polymer containing materials, such as rubber derived, tire derived, or plastic derived materials into output products in accordance with the present disclosure. The reactor 100 includes a feed section 14, a central heating zone section having a first processing zone 10 configured to heat the material to a first temperature and a second processing zone 12 configured to maintain the material at the first temperature, a discharge section 16, at least one water steam injector 19 coupled to at least one water steam source 20. The water steam injector is configured to introduce water steam into the interior of the second processing zone and positioned at the bottom of the second processing zone of the reactor 100. The water steam injector is configured to vary the rate in mass per time unit of the introduction of water steam into the reactor to finely control the properties of recovered carbon black (rCB) affecting the reinforcement performance of rubber made out of the rCB. According to a preferred embodiment of the present invention, for every 1 kg of material residing in the second processing zone, the water stream rate will vary from 0.2 kg/hour to 2 kg/hour.

Figures 2A, 2B, 2C:
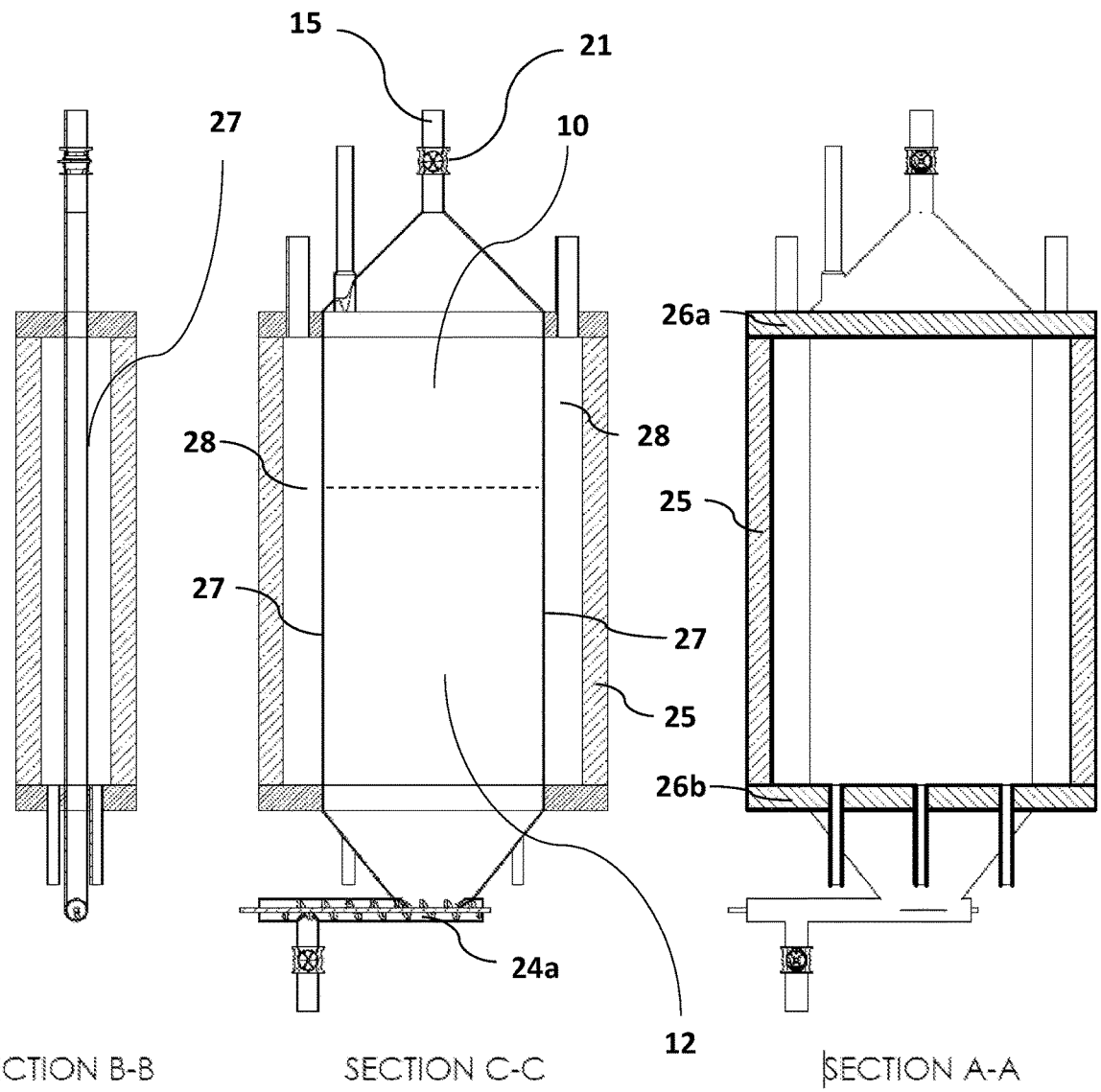
FIG. 2A is a cross-sectional view of the reactor shown in FIG. 1 taken along the B-B lines.
FIG. 2B is a cross-sectional view of the reactor shown in FIG. 1 taken along the C-C lines.
FIG. 2C is a cross-sectional view of the reactor shown in FIG. 1 taken along the A-A lines.
Figure 3:
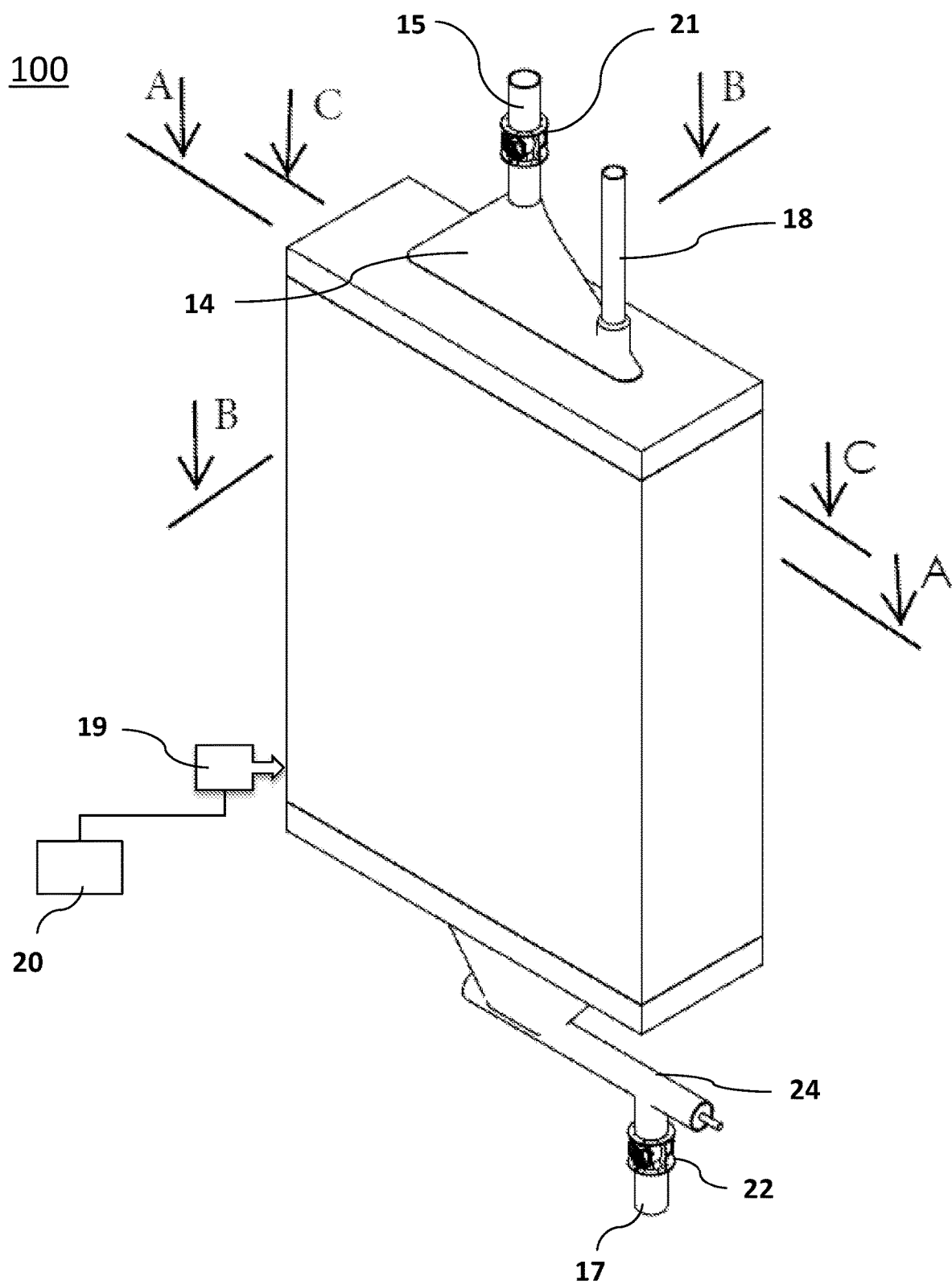
FIG. 3 is a perspective view showing one embodiment of the disclosed reactor incorporating electric or induction heating.
Figure 5:
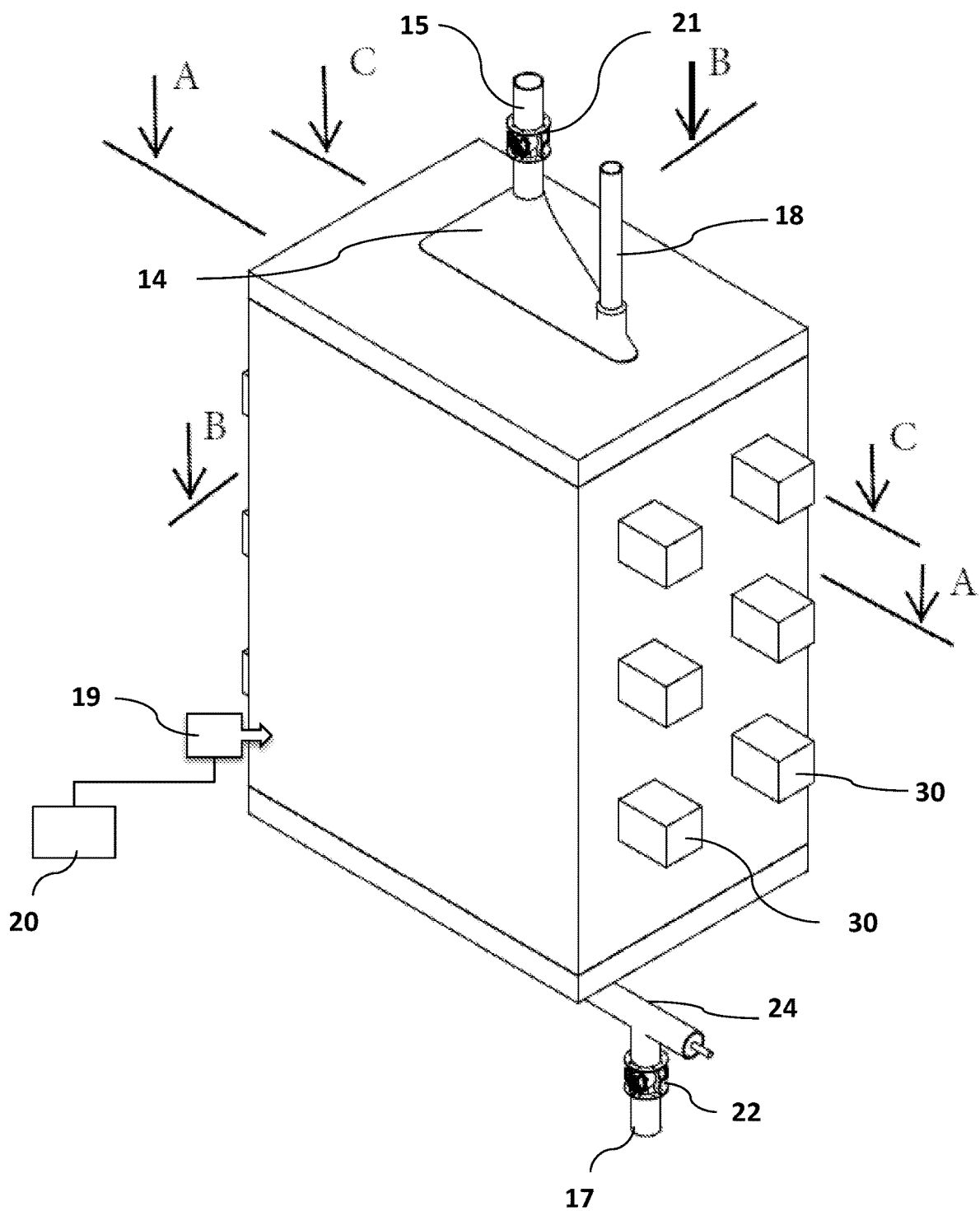
FIG. 5 is a perspective view showing one embodiment of the disclosed reactor having a direct flame heating configuration.
Figures 6A, 6B, 6C:
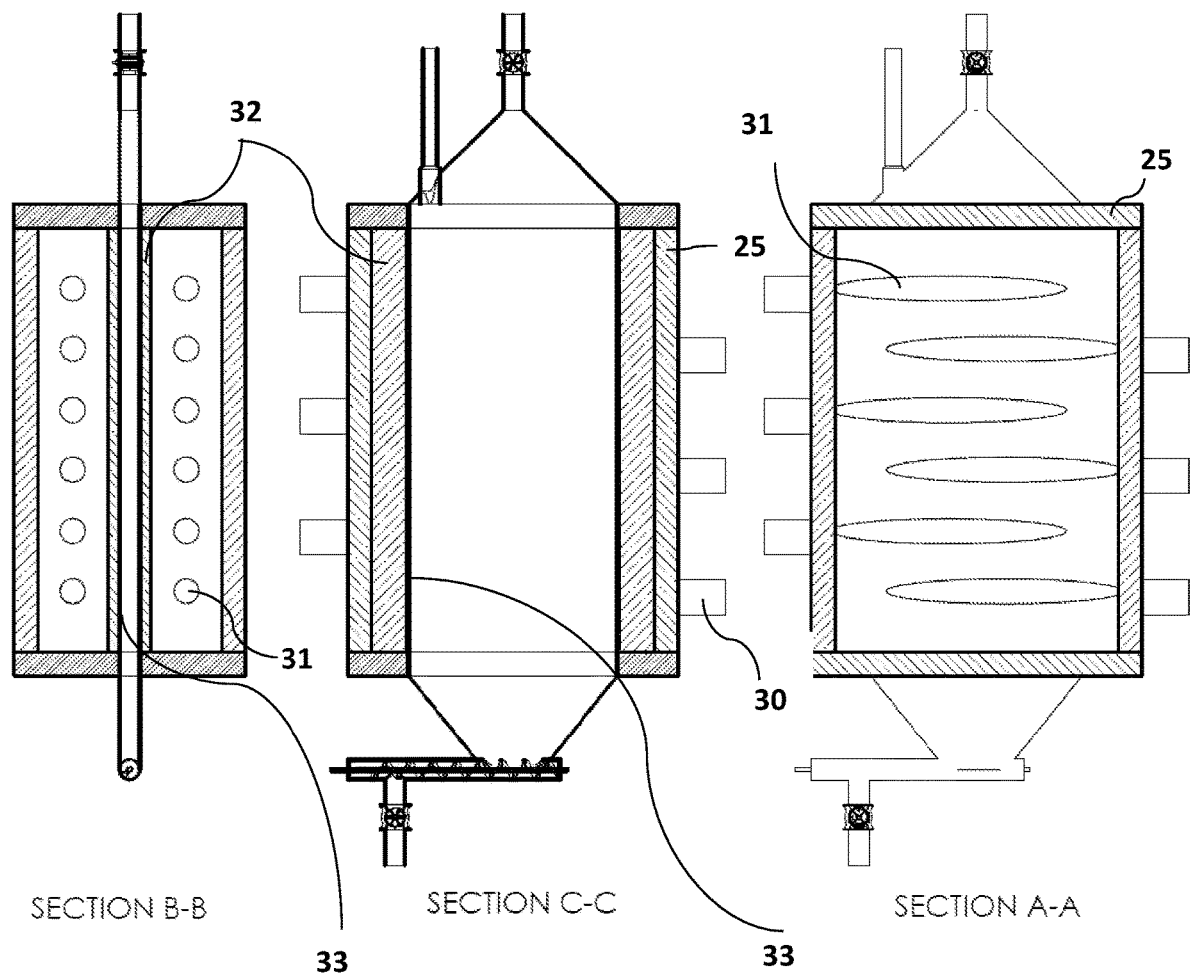
FIG. 6A is a cross-sectional view of the reactor shown in FIG. 5 taken along the B-B lines.
FIG. 6B is a cross-sectional view of the reactor shown in FIG. 5 taken along the C-C lines.
FIG. 6C is a cross-sectional view of the reactor shown in FIG. 5 taken along the A-A lines.

Alternatively, the reactor 100 can be equipped with at least one CO2 gas injector coupled to at least one CO2 gas source and configured to introduce CO2 gas into the interior of the second processing zone and positioned at the bottom of the second processing zone to finely control the properties of rCB affecting the reinforcement performance of rubber made from the recovered carbon black. According to a preferred embodiment of the present invention, for every 1 kg of material residing in the second processing zone, the CO2 rate will vary from 0.2 kg/hour to 2 kg/hour. In some instances, the reactor can include both the water steam injector/source and CO2 gas injector/source. The reactor 100 also includes means for withdrawal of vaporized short-chain hydrocarbon compounds being formed inside the reactor. In some instances, the means for withdrawal can be an opening in the feed section 14 coupled to a conduit 18. The reactor 100 includes heating means for heating the material inside the reactor. In some instances, the heating means can be a hot gas such as a flue gas from a burner or a hot gas agent heated by the flue gas or by other means. The external surface of the reactor body is heated by the hot gas from a burner having one or more input hot gas pipes 23a and one or more output hot gas pipes 23b. The gas is fed into a space 28 formed between stainless steel reactor walls 27 and brick thermal isolation enclosure 25 as shown in FIG. 2B, for example. Alternatively, the hot gas can be fed into tubes positioned inside the reactor or into channels formed by double wall heating ribs as explained in more detail below in references to FIG. 9A and FIG. 9C.

Regardless of a chosen configuration, it is central to the present invention that the hot gas is used for proximity heating only, i.e., when the material is heated by the reactor walls and, if applicable, by additional thermal conductive elements attached to the internal surface of the walls (ribs) by the means of thermal conductivity. Thus, the hot gas being fed through the space/channels formed between the enclosure and walls of the reactor, or alternatively in the tubes positioned inside the reactor is not in direct contact with the materials, which ensures best results in terms of quality of the output products (such as high surface area high structure rCB, capable to exhibit reinforcing behavior in rubber made out of it) and conversion efficiency. The reactor 100 can further include feed hopper 15 coupled to feed section 14 for loading the material into the reactor and discharge hopper 17 for unloading the material from the reactor. The reactor can also include feed airlock 21 coupled to the top of the reactor 100 and discharge airlock 22 coupled to the bottom of the reactor 100 for maintaining substantially oxygen free atmosphere in the reactor. The airlocks can be of various types such as flap airlocks, or preferably rotary airlocks, or a combination thereof (for example, the feed airlock can be a flap-type airlock and the discharge airlock can be a rotary-type airlock or vice versa). The reactor 100 can also include thermal isolation enclosure 25 which can be made of bricks or other suitable ceramic materials for thermal isolation. The enclosure 25 can be made as one integral piece or a combination of parts (in addition to the main body 25, it can include top plate 26a and bottom plate 26b as shown in FIG. 1, for example). The reactor 100 also can include a material transport section 24 coupled to the discharge section 16 for transporting the material from the reactor to the discharge hopper 17. The material transport section 24 can employ a screw conveyor 24a with a plurality of mixing blades affixed to the screw conveyor, as shown in FIG. 2B.

The reactor is configured to gradually heat up the material to a first temperature in the first processing zone 10 as the material is being advanced through the vertical reactor body in downward direction by gravitation forces and then maintain the first temperature in the second processing zone 12 while introducing a water stream from the water steam injector 19 into the second processing zone 12. The first temperature is in the range from 700° C. to 950° C. It was discovered that this particular temperature range is needed to finely control the properties of recovered (i.e., surface area and structure) carbon black (rCB) affecting the reinforcement performance of rubber made out of the recovered carbon black. For example, the material can be gradually heated up from the room temperature to 800° C. as it passes through the first processing zone, and then being maintained at 800° C. in the second processing zone while the water steam or alternatively, $CO_2$ gas, is being introduced into the second processing zone. In some instances, the material can be already pre-heated before introduction into the first processing zone. For example, it can be pre-heated to 400° C. in a pre-processing (e.g., pyrolysis) zone (not shown) and then gradually heated up further to 800° C. in the first processing zone and being maintained at this temperature as it passes through the second processing zone. The temperature of the material is monitored by a plurality of thermocouples position inside the reactor along the length of the first and second processing zones. In some instances, one or more thermocouples can be positioned between the stainless-steel walls of the reactor and the brick enclosure. According to some embodiments of the present disclosure, the reactor can include one or more level sensors (preferably contactless sensors) configured to determine the amount of material in the reactor. The pressure in the reactor is preferably maintained at the absolute pressure of 0.8-1.9 atm to finely control the properties (i.e., surface area and structure) of recovered carbon black (rCB) affecting the reinforcement performance of rubber made out of the recovered carbon black. When the temperature of the material is above 700 degrees Celsius, the introduction of water steam may cause hydrogen and oxygen from the water to combine with carbon from the tire-derived material to form a greater quantity of fuel gas, according to the following schema: $C_nH_m$ (solids)+$H_2O$(gas)+$CO_2$(gas)→$H_2$(gas)+$CO$ (gas)+ $CO_2$(gas)+$C_nH_m$(liquids)+$C_nH_m$(gases).

Some embodiments of the disclosed apparatus and method involve conversion and extraction of resources from ELT material. Conversion is a generic term used hereafter to denote a variety of chemical processes including but not limited to ELT thermolysis, as set forth in further detail below. In one embodiment, tire derived material is the material obtained from discarded ELTs; tires may be annular components that cover and protect the wheels of vehicles such as automobiles, trucks, motorcycles, tractors, bicycles, and similar devices. The tire derived material may contain any material or combination of materials used to construct tires. The tire derived material may include one or more elastomeric polymers, which may be combined into copolymers. The elastomeric polymers may include synthetic or natural rubber material. The elastomeric polymers may include butadiene. The elastomeric polymers may include styrene. In addition to natural or synthetic rubber, the tire-derived material may include carbon black, which may be fine paracrystalline carbon material used for pigmentation and reinforcement of tires, as well as silica. The tire derived material may include metal, such as steel used for reinforcement of tires such as steel-belted radials. The tire scrap material may include natural or synthetic textile material used to reinforce tires, such as silk, cotton, nylon, or para-aramid fibers. The tire derived material may include sulfur, such as sulfur added for vulcanization. The tire derived materials may include other additives such as zinc oxide and clay. For the sake of clarity, the material that is in the process of having extracted from ELT is collectively referred to as tire-derived material, even though after passing through one or more stages of the process as disclosed below, some products may have been extracted from the tire derived material, modifying its chemical or physical composition.

Some embodiments of the disclosed apparatus and method involve extracting products from tire derived material using chemical conversion. Some embodiments of the disclosed apparatus and method involve extracting products from tire derived material using thermolysis performed in substantially oxygen free atmosphere. In some embodiments, thermolysis involves heating of tire derived or other rubber-containing material in presence of water steam, converting them into simpler and smaller organic compounds. In some embodiments of the disclosed method, a portion of the material produced is in excess of the original mass of the tire derived material, which is accomplished by atoms of hydrogen and oxygen contributed by water molecules from the water introduced into the reactor by the water steam injector 19 of FIG. 1; the use of some embodiments of the disclosed process thus unexpectedly produced a higher yield of useful gaseous materials than was possible according to previous methods. The conversion process in present disclosure is implemented in continuous mode, in which new material constantly arrives at the reactor and solid products and any residue are continuously removed. Products produced as a result of conversion may include carbon black, gases, and oils; the gases and oils may have properties conducive to their use as fuel.

The method of the present invention can be implemented in accordance with a single stage model with the rubber being used as an input material, or according to a two-stage model with the pyrolysis char being used as an input material, wherein the first (pyrolysis) stage is aimed at production of high quality and high market value pyrolysis oil, while the second stage does not result in producing of any significant quantities of oil but rather upgrades the pyrolysis char into high quality reinforcing rCB and produces gas.

According to some embodiments of the present disclosure, the heating means can be a plurality of electric or induction heating elements 29 mounted in proximity to external surfaces of the reactor as shown in FIG. 3, 4A-4C, or alternatively inside heating channels 33 disposed inside the reactor as shown in FIG. 9A (top view) or inside double-wall heating ribs 35 as shown in FIG. 9C (top view), for example. The internal ribs 34 can be attached to the internal surface of the reactor by welding or any other suitable means or can form one integral part by casting or sheet metal folding as shown in FIG. 9B. The electric heating elements can be any suitable commercially available industrial heating elements, such as Kanthal® heating elements, for example. Likewise, the induction heating elements can be selected from any suitable commercially available industrial induction heating elements, such as Ultraflex® induction heaters, for example.

In some instances, the heating means can be a direct flame 31 produced by a plurality of burners 30 positioned horizontally or vertically and have unidirectional or bidirectional orientation in proximity to the outside surface of the reactor as shown in FIGS. 5, 6A-6C (horizontal flame positioning with bidirectional orientation), and the reactor is at least partially enclosed by a brick wall 32 separating the reactor from the flame 31. In some instances, the internal surface of the brick wall 32 is cladded with a heat resistant stainless-steel liner 33 to avoid contamination of the material and hence improve quality of output products such as carbon black, as well as prevent the brick walls from wearing off. According to some embodiments of the present invention, the reactor can further include a system control unit (not shown) having a central processing unit (CPU) with at least one processor and memory and configured to operate and control thermocouples, airlocks, level, flow and pressure sensors and heating means such as burners, as well as electric and induction heating elements.

Figure 7:
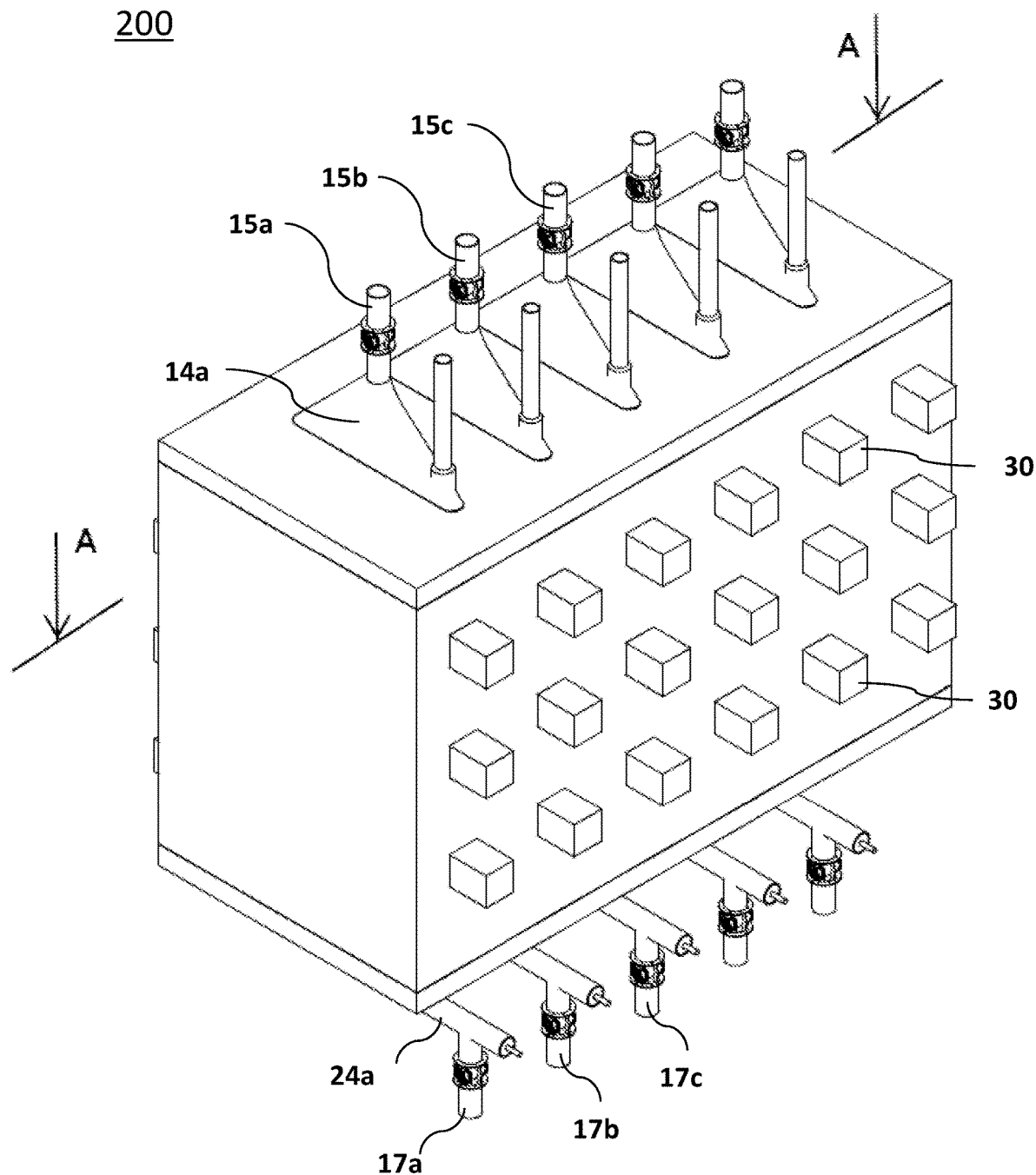
FIG. 7 is a perspective view showing one embodiment of the disclosed a battery reactor unit incorporating a plurality of direct flame heating reactors in a side-by-side configuration.
Figure 8:
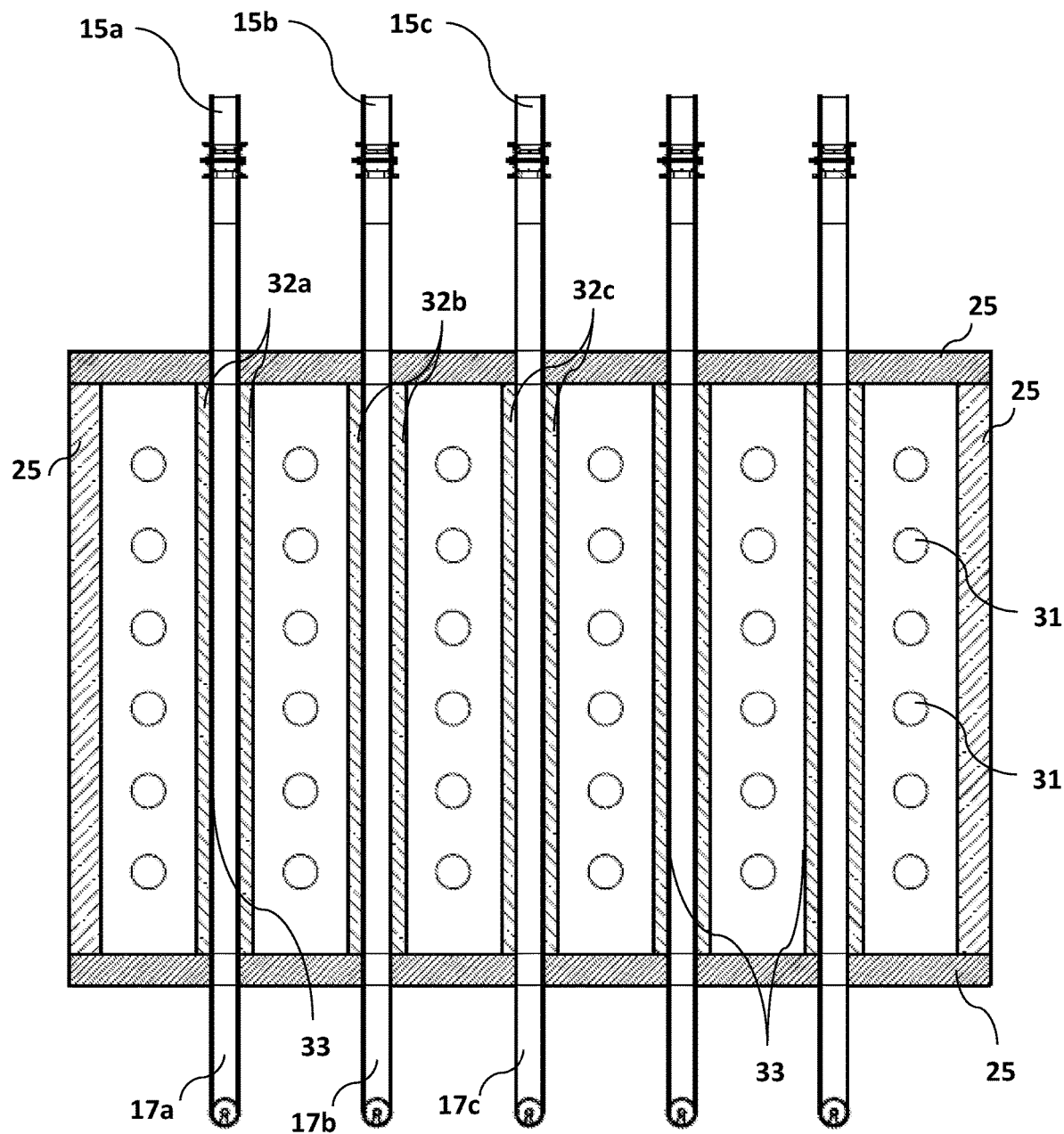
FIG. 8 is a cross-sectional view of the battery reactor unit shown in FIG. 7 taken along the A-A lines.

According to another embodiment of the present disclosure, the reactor unit 200 can include a plurality of side-by-side positioned reactors as shown in FIGS. 7 and 8, for example. This so-called battery configuration is designed to increase the throughput, wherein five side-by-side positioned direct flame heated reactors of FIGS. 7-8 share the common thermal isolation enclosure 25. The same battery configuration can be employed using other types of reactors discussed above. For example, it can include a plurality of hot gas heated reactors or electric or induction heated reactors, or their combination (some reactors can employ electric heating elements and some induction heating elements, or some reactor can employ hot gas heating, for example). This battery system with a plurality of reactors acts as a single unit that includes common input and output material streams and common control system designed to coordinate and operate all the reactors within the unit. The system control unit can include a central processing unit (CPU) with at least one processor and memory and configured to operate and control thermocouples, airlocks, level, flow and pressure sensors and heating means such as burners, as well as electric and induction heating elements.

The thermal conductivity of all materials to be processed in the reactor is very low, e.g., pyrolysis char is approximately 0.2 W/mK and natural rubber is approximately 0.15 W/mK in comparison with stainless steel, which has the thermal conductivity equal to about 13 W/mK. Therefore, the material can be heated either in case when it is positioned in close proximity to the heated reactor walls, or when special heat distribution means are employed.

Heat distribution is achieved by conductive transferring heat inside the processed material from the internal surfaces of the reactor towards material inside the reactor. In accordance with the embodiments of the present invention, effective heat distribution via conductive heat transfer is achieved a) by making cylindrical reactors with diameter (D) less than 40 cm or b) flat wall reactors with thickness (d) less than 35 cm.

Referring now to FIGS. 9A-9D, in some instances, the reactor can further include the heat distribution means for even material temperature distribution inside the reactor, laterally from the center to the sidewalls 32 of the reactor. The heat distribution means can be a plurality of heating channels 34 disposed inside the reactor as shown in FIG. 9A. The heat distribution means can be a plurality of high thermo-conductive solid heating ribs 35 attached to an internal surface of the reactor as shown in FIG. 9B or a plurality of double wall heating ribs 36 attached to the reactor sidewalls 32 with openings to outside as shown in FIG. 9C. These heat distribution means are positioned inside the reactor along the length of the central heating zone section. In some instances of cylindrical reactors, the heat distribution means can be a plurality of rotating mixing blades 37 disposed on a shaft 38 coupled to a motor and configured to scrap heated material from the internal surface of the reactor and move it towards the central axis of the reactor as shown in FIG. 9D. It will be appreciated by a person skilled in the art that the shape of the heat distribution means should be in conformance with the shape of the reactor. For example, the heat distribution means shown in FIGS. 9A-9C are in conformance with the cylindrical shape of the reactor. It's preferable that the body of the reactor has a flat flask-like shape, as for example shown in FIGS. 1-3, to ensure better heat distribution. According to some embodiments of the present invention, the reactor in the flat flask-like shape configuration may have a width at least twice as big as the thickness (for example, if the thickness of the reactor is 30 cm, then the width of the reactor can be at least 60 cm).

It is also preferable that the maximum distance between any particle of the material and the heated internal surface of the reactor be in the range from 5 cm and 20 cm. In some instances, the reactor can include a post-processing zone (not shown) configured to cool down the solid remains to a second temperature. In some instances, the discharge section (discharge section 16 of FIG. 1 for example) can function as a cooling zone configured to cool down the solid remains to a second temperature. It is preferable that the residence time of the material being in the second processing zone of the reactor, which is controlled by the speed of delivery by feed rotary airlock and discharge rotary airlock, be in the range from 0.5 hour to 5 hours, in order to finely control the properties of rCB affecting the reinforcement performance of rubber made out of the rCB.

FIG. 10 illustrates a method 300 for converting polymer containing materials, such as rubber derived, including tire derived, or plastic derived materials, into output products using the reactor of the present disclosure. The method includes heating the material to a first temperature in the first processing zone of the reactor (step 301), maintaining the material at the first temperature in the second processing zone of the reactor (step 302), and introducing water steam by the water steam injector to the second processing zone of the reactor while maintaining the material at the first temperature (step 303a), or alternatively, introducing CO2 gas by the CO2 gas injector to the second processing zone of the reactor while maintaining the material at the first temperature (step 303b). It is central to the method of the present invention to maintain the temperature, pressure, water or/and CO2 rate and material residence time in the second processing zone in the ranges as described above to finely control the properties of recovered carbon black (rCB), in turn affecting the reinforcement performance of rubber made from the rCB.

While at least one exemplary embodiment has been presented in the foregoing detailed description of the invention, it should be appreciated that a vast number of variations exists. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A reactor for converting polymer containing materials, such as rubber, including tire rubber, or pyrolyzed rubber, including pyrolyzed tires, or plastic, including pyrolyzed plastic, into output products, the reactor comprising:
    a feed section;
    a central heating-zone section having a first processing zone configured to heat the material to a first temperature and a second processing zone configured to maintain the material at the first temperature;
    a discharge section;
    at least one opening connected to a withdrawal conduit for withdrawal of vaporized short-chain hydrocarbon compounds being formed;
    at least one water steam injector configured to introduce water steam into the interior of the second processing zone and positioned at the bottom of the second processing zone, or at least one CO2 gas injector configured to introduce CO2 gas into the interior of the second processing zone and positioned at the bottom of the second processing zone, or both;
    a heating means for heating the material residing in the central heating-zone section by heating the reactor walls; and
    a thermal isolation enclosure at least partially surrounding the reactor; wherein the material is being moved in the reactor downward by gravitational forces; wherein the heating means is a plurality of electrical or induction heating elements mounted in proximity to external surfaces of the reactor, or disposed inside the reactor heating channels or double wall ribs, or both.

2. The reactor of claim 1, wherein the first temperature is maintained between 700° C. and 950° C.

3. The reactor of claim 1, further comprising a feed airlock coupled to the top of the reactor and a discharge airlock coupled to the bottom of the reactor and together configured to maintain substantially oxygen free atmosphere in the reactor.

4. The reactor of claim 1, wherein the pressure in the reactor is maintained at the absolute pressure of 0.8-1.9 atm.

5. The reactor of claim 1, wherein the heating means is a hot gas agent comprising flue gas from exhaust or inert gas heated by flue gas.

6. The reactor of claim 1, further comprising a heat distribution means for even temperature distribution laterally from the center to the walls of the reactor comprising at least one of a plurality of heating channels disposed inside the reactor, a plurality of high thermo-conductive solid heating ribs attached to an internal surface of the reactor, and a plurality of double wall heating ribs attached to the reactor walls with openings towards outside of reactor body.

7. The reactor of claim 1, wherein the reactor body is cylindrical; and further comprising a heat distribution means that is a plurality of rotating mixing blades disposed on a shaft coupled to a motor and configured to scrap heated material from the internal surface of the reactor walls and move it towards the central axis of the reactor.

8. The reactor of claim 1, wherein a body of the reactor comprises two opposing, substantially planar major walls joined at their outer edges by a continuous peripheral wall, the distance between the planar major walls being substantially smaller than the lateral dimensions of each wall, thereby defining a generally flattened enclosure.

9. The reactor of claim 1, wherein the maximum distance between any particle of the material and the heated internal surface of the reactor is ranging from 5 cm to 20 cm.

10. The reactor of claim 1 wherein the water steam injector is configured to vary a mass-flow rate of water steam introduced into the reactor, and the CO2 injector is configured to vary a mas-flow rate of CO2 introduced into the reactor; each injector being adjustable to deliver its respective fluid at a mass-flow rate between 0.2 kg/hour and 2 kg/hour for every kilogram of material residing in the second processing zone.

11. The reactor of claim 1, further comprising at least one additional reactor thereby forming a modular system having a plurality of side-by-side positioned reactors.

12. The method for converting polymer containing materials, such as rubber, including tire rubber, or pyrolyzed rubber, including pyrolyzed tires, or plastic, including pyrolyzed plastic, into output products using the reactor of claim 1, the method comprising:
    heating the material to a first temperature in the first processing zone of the reactor;
    maintaining the material at the first temperature in the second processing zone of the reactor;
    subjecting the material to the process of fluidization by introducing water steam by the at least one water steam injector, or CO2 by the at least one CO2 injector, or both to the second processing zone of the reactor while maintaining the material in the second processing zone of the reactor at the first temperature, ranging from 700° C. to 950° C.; and maintaining the pressure in the reactor at the absolute pressure of 0.8-1.9 atm;

wherein the residence time of the material being in the second processing zone, which is controlled by the speed of delivery by a feed airlock and a discharge airlock, is in the range from 0.5 hour to 5 hours.

13. A reactor for converting polymer containing materials, such as rubber, including tire rubber, or pyrolyzed rubber, including pyrolyzed tires, or plastic, including pyrolyzed plastic, into output products, the reactor comprising:
- a feed section;
- a central heating-zone section having a first processing zone configured to heat the material to a first temperature and a second processing zone configured to maintain the material at the first temperature;
- a discharge section;
- at least one opening connected to a withdrawal conduit for withdrawal of vaporized short-chain hydrocarbon compounds being formed;
- at least one water steam injector configured to introduce water steam into the interior of the second processing zone and positioned at the bottom of the second processing zone, or at least one $CO_2$ gas injector configured to introduce $CO_2$ gas into the interior of the second processing zone and positioned at the bottom of the second processing zone, or both;
- a heating means for heating the material residing in the central heating-zone section by heating the reactor walls; and a thermal isolation enclosure at least partially surrounding the reactor; wherein the material is being moved in the reactor downward by gravitational forces; wherein the heating means is a direct flame produced by a plurality of burners; and wherein the reactor is at least partially enclosed by a brick wall separating the reactor from the flame.

14. The reactor of claim 13, wherein the internal surface of the brick wall is cladded by a heat resistant stainless-steel liner to prevent material from being in direct contact with bricks.

* * * * *